United States Patent [19]
Oh et al.

[11] Patent Number: 6,003,209
[45] Date of Patent: Dec. 21, 1999

[54] FILAMENTARY FASTENER AND METHOD OF MAKING SAME USING INSERT MOLDING

[75] Inventors: Hie-Young Oh, Bennington, N.H.; Charles L. Deschenes, North Attleboro, Mass.

[73] Assignee: Avery Dennison Corporation, Pasadena, Calif.

[21] Appl. No.: 08/865,208

[22] Filed: May 29, 1997

Related U.S. Application Data

[63] Continuation-in-part of application No. 08/584,963, Jan. 11, 1996, Pat. No. 5,671,507.

[51] Int. Cl.$^6$ .............................. A41H 37/00; G09F 3/00
[52] U.S. Cl. ...................... 24/114.7; 24/72.7; 24/704.1; 227/67; 425/223
[58] Field of Search .................. 24/114.7, 72.7, 24/711, 90.1, 704.1

[56] References Cited

U.S. PATENT DOCUMENTS

| | | |
|---|---|---|
| Re. 32,332 | 1/1987 | Kato . |
| 3,103,666 | 9/1963 | Bone ........................................ 24/72.7 |
| 3,399,432 | 9/1968 | Merser ................................... 24/114.7 |
| 3,444,597 | 5/1969 | Bone ........................................ 24/72.7 |
| 3,733,657 | 5/1973 | Laniston ................................ 24/704.1 |
| 3,926,201 | 12/1975 | Katz . |
| 3,977,050 | 8/1976 | Perez . |
| 4,008,302 | 2/1977 | Erlichman . |
| 4,288,017 | 9/1981 | Russell ..................................... 227/67 |
| 4,347,932 | 9/1982 | Furuth ..................................... 24/72.7 |
| 4,456,123 | 6/1984 | Russell . |
| 4,462,784 | 7/1984 | Russell .................................... 425/223 |
| 4,503,006 | 3/1985 | Kato . |
| 4,554,711 | 11/1985 | Derringer . |
| 4,636,347 | 1/1987 | Kato . |
| 4,804,332 | 2/1989 | Pirc ......................................... 439/620 |
| 5,238,306 | 8/1993 | Heintz et al. ............................ 383/61 |
| 5,293,668 | 3/1994 | Tibiletti . |
| 5,459,907 | 10/1995 | Nivet . |

OTHER PUBLICATIONS

USPTO Defensive Publication No. T892,023 entitled "Process For Nonmelt fForming Webs Of Thermoplastic Resin And Articlae Formed Thereby," inventprs Filbert et al., published Nov. 30, 1971.

*Primary Examiner*—Victor N. Sakran
*Attorney, Agent, or Firm*—Kriegsman & Kriegsman

[57] ABSTRACT

Filamentary fastener and method of making the same. According to one embodiment, the method comprises the steps of (a) providing a length of stretched flexible filamentary material, (b) insert molding a cross-bar onto the length of stretched flexible filamentary material, (c) insert molding a paddle onto the length of stretched flexible filamentary material, the paddle being spaced apart from the cross-bar, and (d) removing any stretched flexible filamentary material not located between the paddle and the cross-bar. The cross-bar and the paddle may or may not be made of the same material as the stretched flexible filamentary material. Preferably, the stretched flexible filamentary material is made of a plastic, such as propylene, nylon, urethane and combinations thereof.

25 Claims, 2 Drawing Sheets

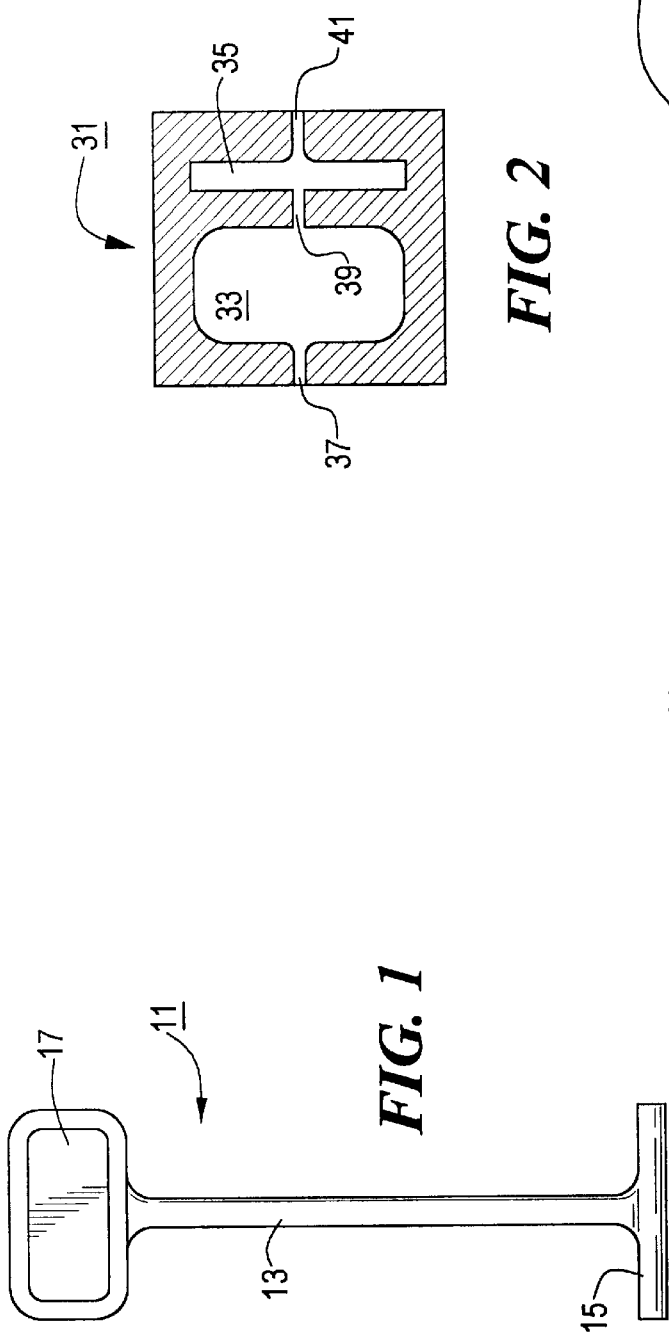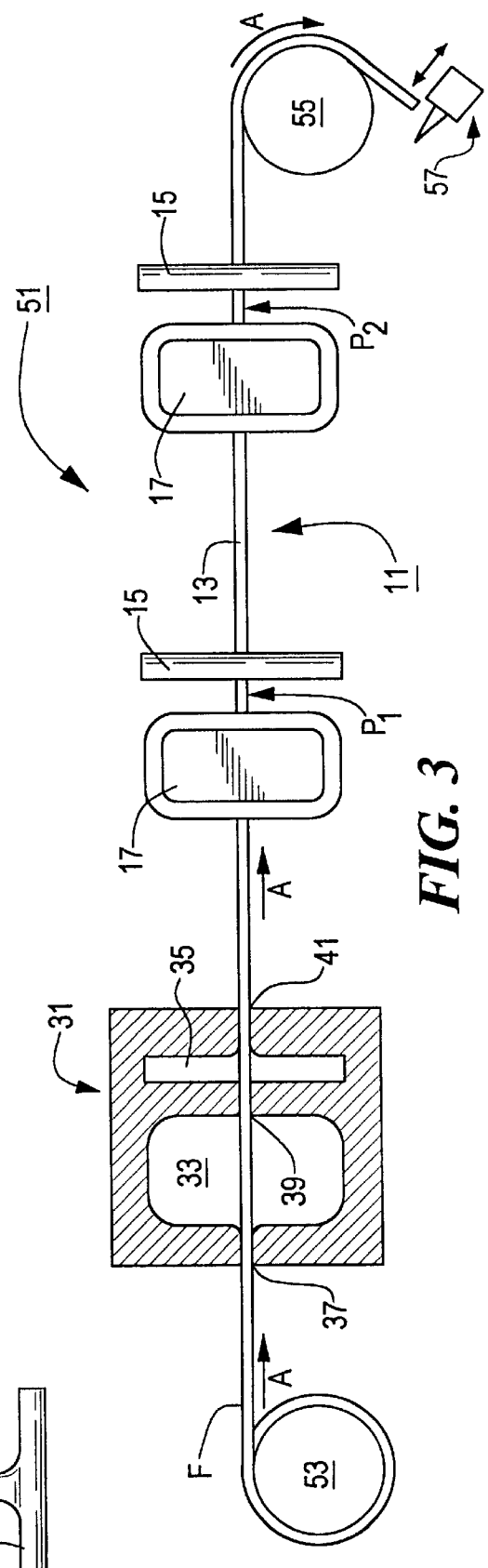

FILAMENTARY FASTENER AND METHOD OF MAKING SAME USING INSERT MOLDING

CROSS-REFERENCE TO RELATED APPLICATIONS

The present application is a continuation-in-part of presently pending U.S. patent application Ser. No. 08/584,963, filed Jan. 11, 1996, now U.S. Pat. No. 5,671,507, the disclosure of which is incorporated herein by reference.

BACKGROUND OF THE INVENTION

The present invention relates generally to fasteners of the type having a flexible filament and more particularly to a novel such fastener and to a method of making said novel fastener.

Filamentary fasteners of the type commonly used to attach tags and the like to articles of commerce are well-known and widely used. Typically, such fasteners are unitary structures made of molded plastic. One such fastener, which is still in widespread use today, includes an elongated, flexible filament having a cross-bar disposed at a first end thereof and either a paddle or a second cross-bar disposed at a second end thereof. In use, the cross-bar disposed at the first end is typically inserted first through a tag and then through the desired article of commerce, with the paddle or second cross-bar not being inserted through the tag or article in order to retain the fastener and tag on the article. Typically, a plurality of the aforementioned fasteners are fabricated together as part of a fastener assembly, examples of which include fastener clips or continuously connected fastener stock. An example of a fastener clip is disclosed in U.S. Pat. No. 3,103,666, inventor Bone, which issued Sep. 17, 1963, and which is incorporated herein by reference. An example of continuously-connected fastener stock is disclosed in U.S. Pat. No. 4,121,487, inventor Bone, which issued Oct. 24, 1978, and which is incorporated herein by reference.

Typically, plastic fasteners of the types described above are fabricated as follows: First, molten plastic is injected into a mold having an impression resembling a fastener clip or continuously connected fastener stock. The molten plastic is then allowed to cool in the mold to the shape defined by the impression. Next, the molded plastic is removed from the mold, and the filamentary portions of the fasteners therein are stretched to a desired length and cross-sectional thickness.

One reason for molding the fastener assembly and then stretching the constituent filaments thereof to the desired final dimensions, as opposed to simply molding the fastener assembly with filaments having the desired final dimensions, is that it is very difficult to mold a filament so that it is as thin and as flexible as is often desired. Another reason is that the stretching of a filament typically alters the polymeric structure of the filament in a beneficial way, endowing the filament with certain physical properties (e.g., resistance against unwanted stretching and/or creeping) it otherwise would not enjoy. For these and other reasons, it has been much more desirable to mold a filamentary fastener so that the filament portion thereof is thicker and shorter than is ultimately desired and then to stretch the filament portion to the desired dimensions.

Typically, the above-described stretching of the filamentary portion of a fastener is performed with a specially-designed stretching machine, which grabs opposite ends of a fastener and pulls them apart in opposing directions. Unfortunately, such machines are often quite expensive, as is the automated equipment typically used to feed unstretched fasteners into said stretching machines.

SUMMARY OF THE INVENTION

According to one aspect of the invention, there is provided a fastener useful in attaching a tag or the like to an article of commerce, said fastener comprising (a) a flexible filament, said flexible filament having a first end and a second end, (b) a first cross-bar insert molded onto said first end of said flexible filament, said first cross-bar being insertable first through a tag and then through an article of commerce, and (c) a first paddle insert molded onto said second end of said flexible filament, said first paddle being appropriately sized to retain a tag on said flexible filament and to prevent said flexible filament from being completely inserted into an article of commerce.

Preferably, the flexible filament of the aforementioned fastener is a length of stretched filamentary plastic material, which may be propylene, nylon, urethane or a combination thereof. The cross-bar and the paddle may be made of the same material as the flexible filament (albeit not stretched) or may be made of a different material than the flexible filament.

According to another aspect of the invention, there is provided a method of making a fastener, said method comprising the steps of (a) providing a length of flexible filamentary material; (b) insert molding a cross-bar onto said length of flexible filamentary material; and (c) insert molding a paddle onto said length of flexible filamentary material, said paddle being spaced apart from said cross-bar.

Preferably, the flexible filamentary material has been stretched prior to the insert molding of the paddle and the cross-bar thereonto. The aforementioned method preferably further comprises, after said insert molding steps, the step of removing any flexible filamentary material not located between said paddle and said cross-bar. Preferably, the flexible filamentary material is a plastic material, which may be propylene, nylon, urethane or a combination thereof. The paddle and the cross-bar may be made of the same type of material as the filamentary material or may be made of a different type of material than the filamentary material.

According to still another aspect of the invention, there is provided an apparatus for use in fabricating a fastener of the type comprising a flexible filament having a first end and a second end, a cross-bar disposed at said first end and a paddle disposed at said second end, said apparatus comprising (a) a mold, said mold being shaped to include a paddle impression and a cross-bar impression, said paddle impression and said cross-bar impression being parallel to one another; and (b) means for feeding flexible filamentary material into said mold and perpendicularly across said paddle impression and said cross-bar impression.

According to still yet another aspect of the invention, there is provided a method of making a fastener, said method comprising the steps of (a) providing a length of flexible filamentary material; (b) providing a mold, said mold being shaped to include a paddle impression and a cross-bar impression, said paddle impression and said cross-bar impression being parallel to one another; (c) insert molding, using said mold, a first paddle and a first cross-bar onto said length of flexible filamentary material; (d) repositioning said length of flexible filamentary material relative to said mold so that said first paddle and said first cross-bar are spaced apart from said mold; and (e) insert molding, using said mold, a second paddle and a second cross-bar onto said length of flexible filamentary material.

According to still a further aspect of the invention, there is provided a method of making a fastener clip, said method comprising the steps of (a) providing a mold, said mold being shaped to include a runner bar impression, a plurality of cross-bar impressions disposed to one side of said runner bar impression and spaced therefrom, each of said cross-bar impressions being parallel to one another and being perpendicular to said runner bar impression, and a corresponding plurality of paddle impressions disposed to an opposite side of said runner bar impression and spaced therefrom, each of said paddle impressions being parallel to one another and being aligned with a corresponding cross-bar impression; (b) providing a plurality of stretched flexible filaments, the number of stretched flexible filaments corresponding to the number of pairs of paddle and cross-bar impressions in said mold; (c) insert molding, using said mold, a first paddle and a first cross-bar onto each of said stretched flexible filaments and a first runner bar interconnecting the plurality of stretched flexible filaments; (d) repositioning each of said stretched flexible filaments relative to said mold so that said first paddles and said first cross-bars are spaced from said mold; and (e) insert molding, using said mold, a second paddle and a second cross-bar onto each of the stretched flexible filaments and a second runner bar interconnecting the plurality of stretched flexible filaments.

Additional aspects, as well as features, advantages and objects, of the present invention will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated in and constitute a part of this specification, illustrate the preferred embodiments of the invention and, together with the description, serve to explain the principles of the invention. In the drawings, wherein like reference numerals represent like parts:

FIG. 1 is a front view of one embodiment of a fastener constructed according to the teachings of the present invention;

FIG. 2 is an enlarged section view of a mold adapted for use in making the fastener of FIG. 1;

FIG. 3 is a schematic section view of an apparatus constructed according to the teachings of the present invention for use in making the fastener of FIG. 1;

DETAILED DESCRIPTION OF PREFERRED EMBODIMENTS

Figure 5B:
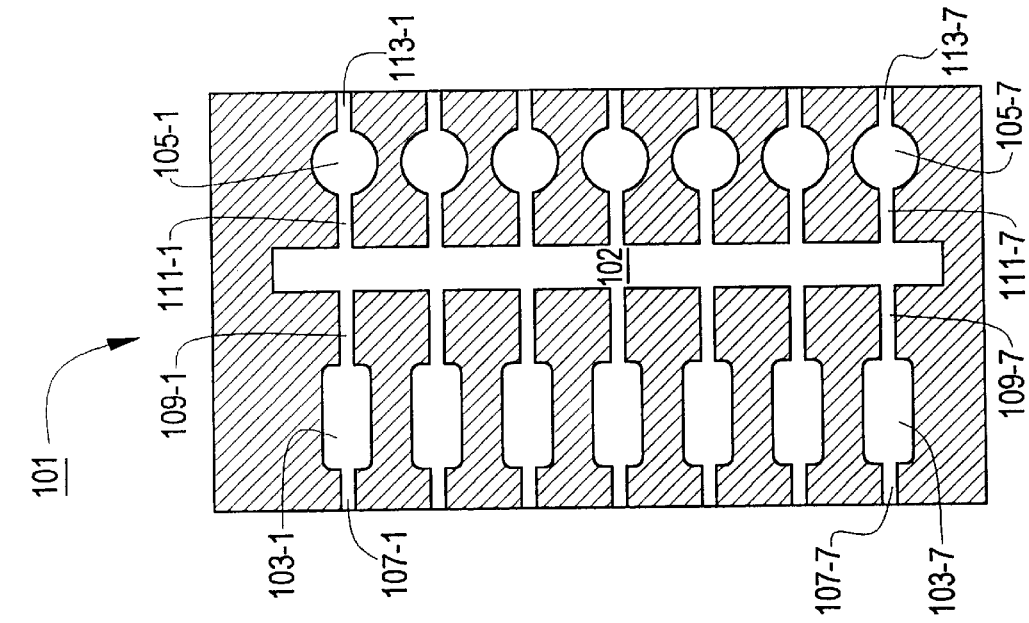
FIGS. 5(a) and 5(b) are schematic section views of a mold adapted for use in making the fastener clip of FIG. 3.

Referring now to FIG. 1, there is shown a front view of one embodiment of a fastener constructed according to the teachings of the present invention, the fastener being represented generally by reference numeral 11.

Fastener 11, which is well-suited for attaching tags to articles of commerce and the like, comprises a flexible filament 13. Preferably, filament 13 is a length of stretched plastic material, such as propylene, nylon, urethane or combinations thereof; however, filament 13 is not limited to such materials and may consist of thread, metallic wire, or any other suitable, flexible, filamentary material.

Fastener 11 also comprises a cross-bar 15, cross-bar 15 being insert molded onto one end of filament 13 in the fashion to be described below. Cross-bar 15 is appropriately sized and shaped to be inserted first through a tag and then through an article of commerce (e.g., a clothing article or the like) in the conventional fashion, i.e., either manually or, preferably, through the hollow slotted needle of a conventional fastener dispensing tool. As will become apparent from the description below, cross-bar 15 must be made of an injection moldable material. Accordingly, cross-bar 15 may be made of the same material as filament 13 or may be made of a different material than filament 13, the only limitation on the selection of materials for cross-bar 15 and filament 13 being that cross-bar 15 must adhere satisfactorily to filament 13. Such adherence may be achieved by selecting materials for cross-bar 15 and filament 13 that inherently adhere satisfactorily to one another or may be achieved by introducing notches or the like into the end of filament 13 to promote mechanical adhesion with cross-bar 15.

Fastener 11 further comprises a paddle 17, paddle 17 being insert molded in the fashion to be described below onto the opposite end of filament 13. Paddle 17 is appropriately sized and shaped to be prevent a tag positioned on filament 13 from being removed therefrom and to prevent filament 13 from being completely inserted into the article of commerce. Paddle 17, like cross-bar 15, must be made of an injection moldable material, the specific material used to make paddle 17 being dependent upon the same criteria discussed above in connection with cross-bar 15. Accordingly, paddle 17 may be made of the same material as cross-bar 15 and/or filament 13 or may be made of a different material than both cross-bar 15 and filament 13.

As can readily be appreciated, instead of insert molding paddle 17 onto the second end of filament 13, one could insert a second cross-bar, identical to cross-bar 15, or any other suitable structure onto the second end of filament 13.

Referring now to FIG. 2, there is shown an enlarged section view of a mold adapted for use in making fastener 11, the mold being constructed according to the teachings of the present invention and being represented by reference numeral 31.

As can be seen, mold 31 is shaped to include a paddle impression 33 and a cross-bar impression 35, impressions 33 and 35 being arranged in mold 31 in a parallel or side-by-side orientation. Impression 33 is sized and shaped to correspond to the dimensions of paddle 17 of fastener 11, and impression 35 is sized and shaped to correspond to the dimensions of cross-bar 15 of fastener 11. Mold 31 is also provided with a plurality of channels 37, 39 and 41, which extend perpendicularly relative to impressions 33 and 35 and which serve to permit a length of flexible filamentary material to be inserted through mold 31 and to extend across impressions 33 and 35. Channels 37, 39 and 41 are dimensioned in cross-section to approximate the cross-sectional dimensions of the flexible filamentary material inserted therethrough. Although not shown, mold 31 is also provided with an opening through which molten material may be dispensed into impressions 33 and 35.

Although not shown, mold 31 is appropriately constructed to permit access to and removal of the hardened molded material formed in impressions 33 and 35. Accordingly, mold 31 may comprise a pair of halves interconnected by a hinge or similar connecting structure.

Referring now to FIG. 3, there is schematically shown an apparatus for use in making fasteners 11, the apparatus being constructed according to the teachings of the present invention and being represented generally by reference numeral 51.

As can be seen, apparatus 51 comprises mold 31. In addition, apparatus 51 comprises means for feeding flexible filamentary material F through channels 37, 39 and 41 and across impressions 33 and 35 of mold 31. In the present embodiment, said feeding means comprises a pair of reels 53 and 55.

In use, filamentary material F, which is preferably a stretched plastic, is fed from reel 53 into mold 31. Molten material, which is also preferably a plastic, is then injected into impressions 33 and 35 of mold 31 via an opening (not shown) in mold 31. The molten material is then allowed to cool and harden in mold 31. Mold 31 is then opened, and the filamentary material F, together with the paddle 17 and the cross-bar 15 formed thereonto, is then advanced in the direction indicated by arrows A by a distance slightly greater than the desired length of the filament portion 13 of the fastener 11. The aforementioned process is performed for a number of iterations, two such iterations shown in FIG. 3. Apparatus 51 further comprises cutting means, which in the present embodiment is a movably mounted knife 57. Knife 57 cuts the filamentary material F between each couplet of paddles 17 and cross-bars 15 formed during a single molding iteration, for example, at points $P_1$ and $P_2$, to yield a plurality of fasteners 11 wherein each fastener 11 includes the cross-bar 15 from one molding iteration and the paddle 17 from the previous molding iteration.

Some of the benefits or advantages of forming fasteners 11 in the manner described above, as compared to the conventional manner wherein the entire fastener is injection molded at once and then the filamentary portion thereof is stretched, are as follows: (1) The size of the mold of the present invention will typically be smaller and, therefore, less expensive, than that of conventional molds due to the fact that the filamentary portion of the fastener of the present invention is not molded together with the remainder of the fastener; (2) The cycle time for fabricating successive fasteners with the same mold will typically be shorter in the process of the present invention due to the fact that less material is being molded at one time; (3) Fasteners having filaments of different lengths can easily be fabricated in accordance with the present method merely by varying the amount of filamentary material that is fed through the mold; (4) The use of expensive stretching equipment at the fastener fabrication site is not necessary as one can fabricate the fastener using pre-stretched filamentary material; (5) One can vary the strength/weakness of the adherence of the paddle and/or cross-bar to the filament by the selection of particular materials used to make the filament, the paddle and the cross-bar; (6) One can vary the strength/weakness of the adherence of the paddle and/or cross-bar to the filament by employing various mechanical bonding techniques; (7) One can fabricate fasteners wherein the filament is a different color than the cross-bar and paddle; and (8) One can vary the performance characteristics of the fastener by varying the type of filamentary material used.

Figure 4:
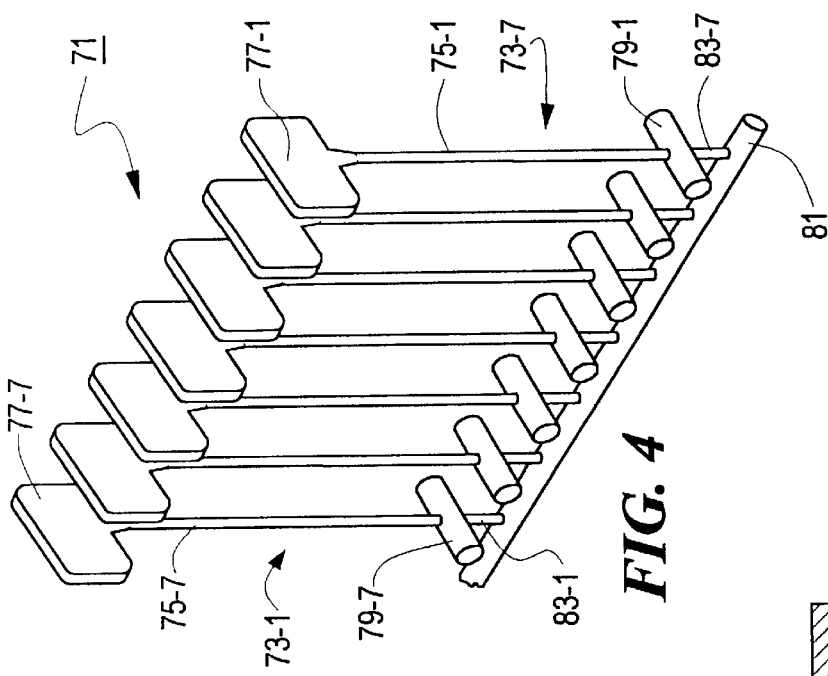
FIG. 4 is a perspective view of one embodiment of a fastener clip constructed according to the teachings of the present invention.

Referring now to FIG. 4, there is shown a perspective view of one embodiment of a fastener clip constructed according to the teachings of the present invention, the fastener clip being represented generally by reference numeral 71.

Fastener clip 71 comprises a plurality of fasteners 73-1 through 73-7, the particular number of fasteners 73 in fastener clip 71 being illustrative only. Fasteners 73, which resemble fastener 11 in appearance and which may be made from the same types of materials as fastener 11, each include a flexible filament 75, a paddle 77 and a cross-bar 79. Fastener clip 71 also includes a runner bar 81, fasteners 73-1 through 73-7 being connected to runner bar 81 by connectors 83-1 through 83-7, respectively. Fasteners 73-1 through 73-7 are arranged with their respective cross-bars 79 parallel to one another on runner bar 81, with the longitudinal axes of cross-bars 83-1 through 83-7 being perpendicular to the longitudinal axis of runner bar 81.

Fastener clip 71 may be made in much the same way described above for fastener 11, the principal differences being that (i) a different mold must be used, (ii) a plurality of filaments corresponding to the number of fasteners in the clip must be fed into the mold and (iii) the cutting means must be capable of cutting a plurality of filaments.

Figure 5A:
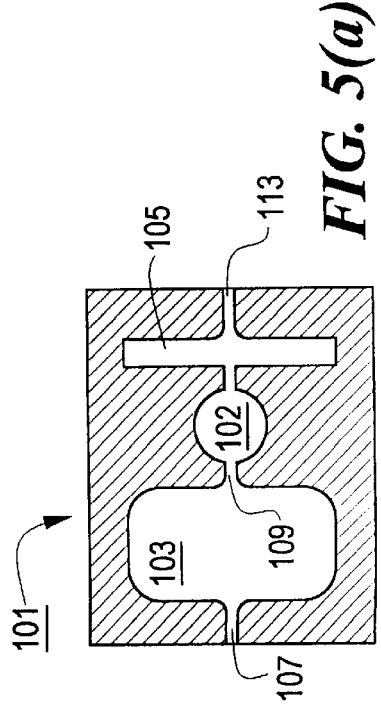

Referring now to FIGS. 5(a) and 5(b), there are shown enlarged section views of a mold adapted for use in making fastener clip 71, the mold being constructed according to the teachings of the present invention and being represented by reference numeral 101.

As can be seen, mold 101 includes a runner bar impression 102, impression 102 being sized and shaped to correspond to the dimensions of runner bar 81 of fastener clip 71. Mold 101 also includes a plurality of paddle impressions 103-1 through 103-7 and a corresponding plurality of cross-bar impressions 105-1 through 105-7. Paddle impressions 103-1 through 103-7, which are located off to one side of runner bar 102, are arranged so as to be parallel to one another and perpendicular to runner bar 102. Paddle impressions 103-1 through 103-7 are sized and shaped to correspond to the dimensions of paddles 77-1 through 77-7 of clip 71. Cross-bar impressions 105-1 through 105-7, which are located off to the opposite side of runner bar 102, are aligned with paddle impressions 103-1 through 103-7, respectively. Cross-bar impressions 105-1 through 105-7, which are sized and shaped to correspond to the dimensions of cross-bars 79-1 through 79-7 of clip 71, are arranged so as to be parallel to one another and perpendicular to runner bar 102.

Mold 101 is also provided with a plurality of channels 107-1 through 107-7, 109-1 through 109-7, 111-1 through 111-7 and 113-1 through 113-7, which extend perpendicularly relative to paddle impressions 103-1 through 103-7, runner bar impression 102 and cross-bar impression 105-1 through 105-7, respectively, and which serve to permit lengths of flexible filamentary material to be inserted through mold 101 and to extend across impressions 102, 103-1 through 103-7 and 105-1 through 105-7. Channels 107, 109, 111 and 113 are dimensioned in cross-section to approximate the cross-sectional dimensions of the flexible filamentary material inserted therethrough.

Although not shown, mold 101 is also provided with an opening through which molten material may be dispensed into impressions 102, 103-1 through 103-7 and 105-1 through 105-7. In addition, although not shown, mold 101 is appropriately constructed to permit access to and removal of the hardened molded material formed in impressions 102, 103-1 through 103-7 and 105-1 through 105-7. Accordingly, mold 101 may comprise a pair of halves interconnected by a hinge or similar connecting structure.

The embodiments of the present invention recited herein are intended to be merely exemplary and those skilled in the art will be able to make numerous variations and modifications to it without departing from the spirit of the present invention. Moreover, certain of said variations and modifications, while producing less than optimal results, may still produce satisfactory results. All such variations and modifications are intended to be within the scope of the present invention as defined by the claims appended hereto.

What is claimed is:

1. A method of making a fastener, said method comprising the steps of:
   (a) providing a length of flexible filamentary material;
   (b) insert molding a cross-bar onto said length of flexible filamentary material; and
   (c) insert molding a paddle onto said length of flexible filamentary material, said paddle being spaced apart from said cross-bar.

2. The method as claimed in claim 1 wherein said flexible filamentary material is plastic, said method further comprising, before said insert molding steps, stretching the length of flexible filamentary material.

3. The method as claimed in claim 2 further comprising the step of removing any stretched flexible filamentary material not located between said paddle and said cross-bar insert molded thereonto.

4. The method as claimed in claim 2 wherein said paddle and said cross-bar are made of the same type of material as said stretched flexible filamentary material.

5. A method of making a fastener, said method comprising the steps of:
   (a) providing a length of flexible filamentary material, said length of flexible filamentary material being plastic;
   (b) stretching the length of flexible filamentary material;
   (c) insert molding a cross-bar onto said length of stretched flexible filamentary material; and
   (d) insert molding a paddle onto said length of stretched flexible filamentary material, said paddle being spaced apart from said cross-bar, said paddle and said cross-bar being made of the same type of material as said stretched flexible filamentary material, said paddle and said cross-bar being made of a material selected from the group consisting of propylene, nylon, urethane and combinations thereof.

6. A method of making a fastener, said method comprising the steps of:
   (a) providing a length of flexible filamentary material;
   (b) insert molding a cross-bar onto said length of flexible filamentary material; and
   (c) insert molding a paddle onto said length of flexible filamentary material, said paddle being spaced apart from said cross-bar, said paddle and said cross-bar not being made of the same type of material as said stretched flexible filamentary material.

7. A method of making a fastener, said method comprising the steps of:
   (a) providing a length of flexible filamentary material;
   (b) providing a mold, said mold being shaped to include a paddle impression and a cross-bar impression, said paddle impression and said cross-bar impression being parallel to one another;
   (c) insert molding, using said mold, a first paddle and a first cross-bar onto said length of flexible filamentary material;
   (d) repositioning said length of flexible filamentary material relative to said mold so that said first paddle and said first cross-bar are spaced apart from said mold; and
   (e) insert molding, using said mold, a second paddle and a second cross-bar onto said length of flexible filamentary material.

8. The method as claimed in claim 7 further comprising the step of severing the flexible filamentary material at a first point between the first paddle and the first cross-bar and at a second point between the second paddle and the second cross-bar.

9. The method as claimed in claim 7 further comprising repeating steps (c) through (e) for successive pairs of paddles and cross-bars.

10. The method as claimed in claim 7 wherein said first and second paddles and said first and second cross-bars are made of the same type of material as said flexible filamentary material.

11. The method as claimed in claim 10 wherein said first and second paddles and said first and second cross-bars are made of plastic.

12. The method as claimed in claim 11 wherein said first and second paddles and said first and second cross-bars are made of a material selected from the group consisting of propylene, nylon, urethane and combinations thereof.

13. A method of making a fastener, said method comprising the steps of:
   (a) providing a length of flexible filamentary material;
   (b) providing a mold, said mold being shaped to include a paddle impression and a cross-bar impression, said paddle impression and said cross-bar impression being parallel to one another;
   (c) insert molding, using said mold, a first paddle and a first cross-bar onto said length of flexible filamentary material;
   (d) repositioning said length of flexible filamentary material relative to said mold so that said first paddle and said first cross-bar are spaced apart from said mold;
   (e) insert molding, using said mold, a second paddle and a second cross-bar onto said length of flexible filamentary material;
   (f) wherein said first and second paddles and said first and second cross-bars are not made of the same type of material as said flexible filamentary material.

14. The method as claimed in claim 7 wherein said flexible filamentary material is made of stretched plastic.

15. A method of making a fastener clip, said method comprising the steps of:
   (a) providing a mold, said mold being shaped to include a runner bar impression, a plurality of cross-bar impressions disposed to one side of said runner bar impression and spaced therefrom, each of said cross-bar impressions being parallel to one another and being perpendicular to said runner bar impression, and a corresponding plurality of paddle impressions disposed to an opposite side of said runner bar impression and spaced therefrom, each of said paddle impressions being parallel to one another and being aligned with a corresponding cross-bar impression;
   (b) providing a plurality of stretched plastic flexible filaments, the number of stretched plastic flexible filaments corresponding to the number of pairs of paddle and cross-bar impressions in said mold;
   (c) insert molding, using said mold, a first paddle and a first cross-bar onto each of said stretched plastic filaments and a first runner bar interconnecting the plurality of stretched plastic flexible filaments;

(d) repositioning each of said stretched plastic flexible filaments relative to said mold so that said first paddles and said first cross-bars are spaced from said mold; and (e) insert molding, using said mold, a second paddle and a second cross-bar onto each of the stretched plastic flexible filaments and a second runner bar interconnecting the plurality of stretched plastic flexible filaments.

16. The method as claimed in claim 15 further comprising the step of severing each of the stretched plastic flexible filaments at a first point between the first runner bar and the first paddle and at a second point between the second runner bar and the second paddle.

17. The method as claimed in claim 15 further comprising repeating steps (c) through (e) for successive sets of paddles, cross-bars and runner bars.

18. The method as claimed in claim 15 wherein said stretched plastic flexible filament is made of the same type of material as said first and second cross-bars and said first and second paddles.

19. The method as claimed in claim 15 wherein said stretched plastic flexible filament is not made of the same type of material as said first and second cross-bars and said first and second paddles.

20. A method of making a fastener, said method comprising the steps of:

(a) providing a length of flexible filamentary material;

(b) providing a mold, said mold being shaped to include a first impression, said first impression being in the shape of a cross-bar;

(c) insert molding, using said first impression, a first cross-bar onto said length of flexible filamentary material;

(d) repositioning said length of flexible filamentary material so that said first cross-bar is spaced away from said mold; and (e) insert molding, using said first impression, a second cross-bar onto said length of flexible filamentary material.

21. The method as claimed in claim 20 wherein said flexible filamentary material is made of stretched plastic.

22. The method as claimed in claim 20 wherein said mold is also shaped to include a second impression, said second impression being positioned relative to said first impression so that said flexible filamentary material may be inserted through both said first impression and said second impression for simultaneous insert-molding onto said flexible filamentary material.

23. A method of making a fastener clip, said method comprising the steps of:

(a) providing a mold, said mold being shaped to include a runner bar impression, a first plurality of impressions disposed on one side of said runner bar impression and spaced therefrom and a corresponding second plurality of impressions disposed on an opposite side of said runner bar impression and spaced therefrom, said first plurality of impressions and said second plurality of impressions being aligned with one another, each of said first plurality of impressions being in the shape of a first end of a fastener, each of said second plurality of impressions being in the shape of a second end of a fastener;

(b) inserting a plurality of flexible filaments into said mold, each of said flexible filaments extending across one of said second plurality of impressions, said runner bar and one of said first plurality of impressions;

(c) insert molding, using said mold, one second end of a fastener and one first end of a fastener onto each of said flexible filaments and a first runner bar interconnecting the plurality of flexible filaments;

(d) repositioning each of said flexible filaments relative to said mold so that said first ends and said second ends formed on said flexible filaments are spaced away from said mold; and (e) repeating step (c) to form another second end and another first end on each of said flexible filaments, as well as a second runner bar interconnecting the plurality of flexible filaments.

24. The method as claimed in claim 23 further comprising the step of severing each flexible filament at a first point between said first runner bar and the second end nearest thereto and at a second point between said second runner bar and the second end nearest thereto.

25. The method as claimed in claim 23 wherein each of said first plurality of impressions is in the shape of a cross-bar.

* * * * *